April 16, 1946.   D. BANCROFT ET AL   2,398,401
DYNAMIC PRESSURE GAUGE
Filed Feb. 17, 1944

ROY W. GORANSON
DENNISON BANCROFT
INVENTORS

BY
ATTORNEY

Patented Apr. 16, 1946

2,398,401

UNITED STATES PATENT OFFICE 2,398,401

DYNAMIC PRESSURE GAUGE

Dennison Bancroft, Cabin John, Md., and
Roy W. Goranson, Washington, D. C.

Application February 17, 1944, Serial No. 522,710

5 Claims. (Cl. 201—48)

(Granted under the act of March 3, 1883, as
amended April 30, 1928; 370 O. G. 757)

This invention relates broadly to pressure measuring devices, and in particular to devices for the measurement of high pressures of short duration.

Devices for the measurement of high pressures have taken various forms. Many of them comprise means for compressing a pile of carbon discs whereby the change in resistance of the carbon pile is used as an indicia of the pressure. In others the reluctance of a magnetic circuit is changed and measured. The fact that application of pressure to a conductor will cause a change in its resistance has been utilized to measure high pressures.

In accordance with the invention the pressure to be measured is caused to shorten the length and increase the cross-sectional area of a wire, these two changes each having the effect of decreasing its resistance; the wire itself being maintained out of physical contact with the medium which is being pressurized. The wire is mounted inside a fluid-tight transmitter which deforms under the application of pressure. This transmitter is so constructed that its deformation acts to shorten the wire and increase its cross-section. The resulting change in resistance is practically instantaneous and is indicated by a suitable instrument. A gauge made in accordance with the invention will measure pressures of from 100 to 10,000 pounds per square inch, having a duration as short as one two-hundred-thousandth of a second.

While the transmitter is subjected to these high pressures the wire itself does not come into contact with the pressure medium, resulting in the advantage that the pressure medium does not have to permeate to the surface of the wire in the process of applying and releasing pressure. For this reason the gauge is better able to follow changes in pressure. Also, since the wire does not contact the pressure medium, the transmitter containing the wire can be used in a medium which is an electrical conductor. The transmitter may be constructed with a maximum dimension of three-fourths of an inch, exclusive of the electrical leads.

Accordingly, it is a primary object of the invention to provide a novel pressure gauge for the measurement of high pressures of short duration, wherein the pressure is used to change the resistance of a conductor to give an indicia of the pressure.

Another important object of the invention is the provision of a novel pressure measuring transmitter unit wherein the deformation of a container under pressure changes the physical dimensions of a conductor to vary its resistance.

Another object of the invention is to provide a novel pressure gauge which depends upon the change in resistance of a conductor under pressure, wherein the conductor itself is isolated from physical contact with the pressurized fluid.

Another object is the provision of a novel resistance element which may be compressed to vary its resistance.

Another object is the provision of a novel resistance element comprising a solid conductor and a support therefor, wherein the application of a strain to the support affects the resistance of the conductor.

Another object is a method of prestressing a resilient element of a pressure gauge.

Other objects will become apparent from the following description and from the drawing, wherein.

Figure 1:
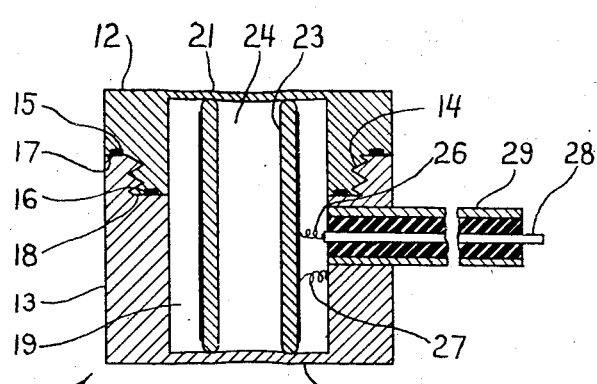
Fig. 1 is a view in section of an embodiment of the invention.

As shown in Fig. 1 the transmitter 11 is made in upper and lower cup-shaped parts 12 and 13 which are fastened together by a male and female threaded connection 14. Resilient washers 15 and 16 are recessed into the shoulders 17 and 18 of the member 12 and are compressed against mating shoulders on the female member 13 to form a fluid-tight seal when members 12 and 13 are fastened together. Thus the transmitter has an interior chamber 19, cylindrical in shape, and closed at each end by the bases 21 and 22 of the cup-shaped elements 12 and 13.

Figure 2:
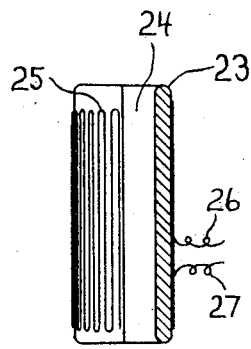
Fig. 2 is a sectional view of the resistance element and its support.

A support 23, cylindrical in shape and having a central bore 24, extends between and is held in place in chamber 19 by the bases 21 and 22. When pressure is applied to the exterior of the transmitter 11, the bases 21 and 22 act as diaphragms, flexing inwardly and compressing the support 23. An insulated resistance wire 25 is cemented to the outside of the support 24 as shown more clearly in Fig. 2. The wire, in a continuous length, is laid longitudinally and parallel to the axis of the support, being doubled back as it reaches each end. Thus although the support is comparatively short, the wire extends axially of the support but is many times as long. Care is taken not to have the wire short circuit itself at any point along its length as this would cut down its resistance. The cement bonds the wire along its entire length to the support. With this construction, when bases 21 and 22 are flexed inwardly upon the application of pressure, support 23 is compressed, and since the wire 25 is cemented to the support it is similarly compressed and shortened, with a corresponding increase in cross-section. Since the resistance of a wire is proportionate to its length and inversely proportional to its cross-sectional area, the resistance of the wire 25 decreases as it is compressed. It is this change in resistance which is measured to find the pressure that the transmitter is subjected to, as will be further explained.

One of the ends of wire 25 forms a lead 27 which may be soldered to the inside of the transmitter 11. The other end forms a lead 26 which is soldered to one end of an insulated conductor 28 extending through the wall of the transmitter 11. A copper tube 29 passes through and is soldered to the transmitter wall to form a passageway for the insulated conductor 28 to the interior of the transmitter. The tube 29 also forms a second conductor, connected electrically to the lead 27, since both lead 27 and tube 29 are soldered to the transmitter wall.

Figure 3:
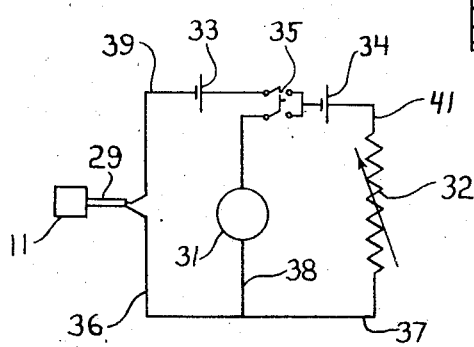
Fig. 3 shows a circuit which may be employed in connection with the invention.

Tube 29 and conductor 28 are connected to the circuit shown in Fig. 3, containing an oscillograph 31, a variable resistance 32, batteries 33 and 34, and a double pole, single throw switch 35, connected as shown by conductors 36, 37, 38, 39 and 41. Batteries 33 and 34 are of equal strength, so that with switch 35 closed, and resistance 32 properly adjusted, there will be no current in conductor 38 which includes the oscilloscope 31, when the transmitter 11 is not subjected to a pressure. However, application of pressure to the transmitter decreases the resistance of the resistance wire 25, causing a current in conductor 38. When an oscilloscope is used to measure this current it is possible to measure pressures up to 10,000 pounds per square inch having a duration as short as one two-hundred-thousandth of a second. With such a degree of sensitivity the device may be used to measure pressures developed by underwater explosions.

In use the transmitter may be suspended in the fluid by means of the copper tube 29, which may be of any length sufficient so that its open end will be out of the fluid and zone where the pressure is applied. This is necessary in order to prevent pressure causing the fluid to enter the inside of the transmitter 11 via the bore of the tube. If the pressure is to be applied to a fluid in a closed tank the tube 29 will pass through the wall of the tank to the atmosphere, means being provided to seal the opening where it passes through the wall, as shown for example in Fig. 4.

Figure 4:
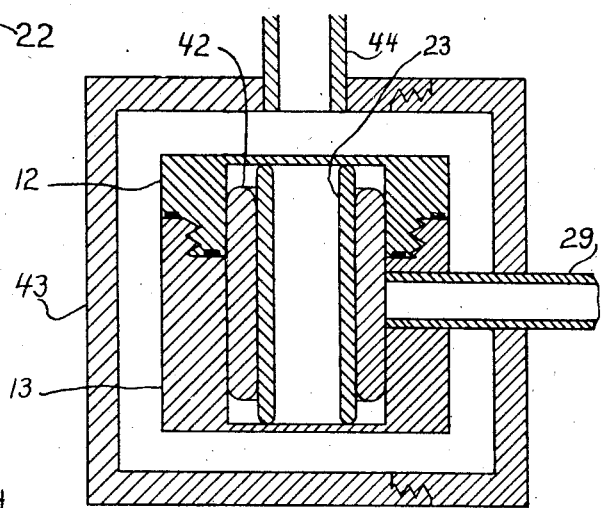
Fig. 4 is a view in section of the transmitting unit and apparatus used during one stage of its manufacture.

Fig. 4 shows a step in the manufacture of the transmitter. Before the resistance wire 25 is placed on the support 23, the support, which may be made of hardened drill rod, is placed inside the cup-shaped elements 12 and 13 which are of phosphor bronze, and located therein by a spacer 42 having a close sliding fit with both the support and the interior walls of the transmitter. Elements 12 and 13 are screwed together tightly, and the transmitter is placed inside a pressure vessel 43, with the tube 29 sealed where it passes through the vessel. While the transmitter is in the vessel a pressure of 10,000 pounds per square inch is applied to the interior of vessel 43 through the inlet 44. The bases 21 and 22 of elements 12 and 13 are slightly deformed by the pressure, taking a shape as shown in Fig. 1, instead of being flat as shown in Fig. 4. This treatment makes bases 21 and 22 highly resistant to deformation at pressures less than 10,000 pounds per square inch. After the transmitter is removed from the pressure vessel, disassembled, and the spacer 42 removed, the new shape of bases 21 and 22 suffices to properly locate the support 23.

The invention described herein may be manufactured and used by or for the Government of the United States of America for governmental purposes without the payment of any royalties thereon or therefor.

What is claimed is:

1. A fluid pressure measuring device comprising a transmitter sealed against the entrance of fluid, said transmitter having opposing base portions and a connecting wall portion which is more rigid than said base portions; an axially extending central internal support connecting said base portions for resisting the inward movement of said base portions under pressure; and a wire fixedly attached to said support so as to be longitudinally compressed with said support upon application of pressure to said transmitter.

2. In a pressure responsive device, a cylindrical housing closed at each end by a relatively flexible base; said bases being inwardly deformable under pressure; a central support within said housing extending axially between and secured against lateral displacements by said bases to restrict said bases against inward movement; and an axially extending resistance element fixedly attached to said support whereby said resistance is longitudinally compressed with said support upon application of pressure to the exterior of the housing.

3. In a pressure responsive device a cylindrical housing closed at each end by a relatively flexible base; a central cylindrical support within said housing, extending axially between said bases to restrict them against inward movement; a resistance wire fixedly attached to said support, said wire extending longitudinally of said support and parallel to the axis thereof, and being looped back upon itself near each end of the support, whereby the resistance wire is many times the length of said support yet is longitudinally compressed with said support upon the application of pressure to the exterior of the housing.

4. The device described in claim 3 wherein said relatively flexible bases have been prestressed by the application of a pressure near the contemplated maximum operating pressure; whereby said bases are slightly deformed.

5. In the manufacture of a pressure responsive device comprising a cylindrical housing closed at the ends by relatively resilient bases, the steps of assembling said housing with an internal axially extending central support which extends between said bases, and applying an external pressure to said housing equivalent to the contemplated maximum operating pressure, whereby said bases are prestressed beyond the elastic limit and slightly but permanently deformed inwardly.

DENNISON BANCROFT.
ROY W. GORANSON.